July 12, 1927.
C. H. SEIFERT
1,635,963
ROTARY VALVE
Filed May 18, 1926
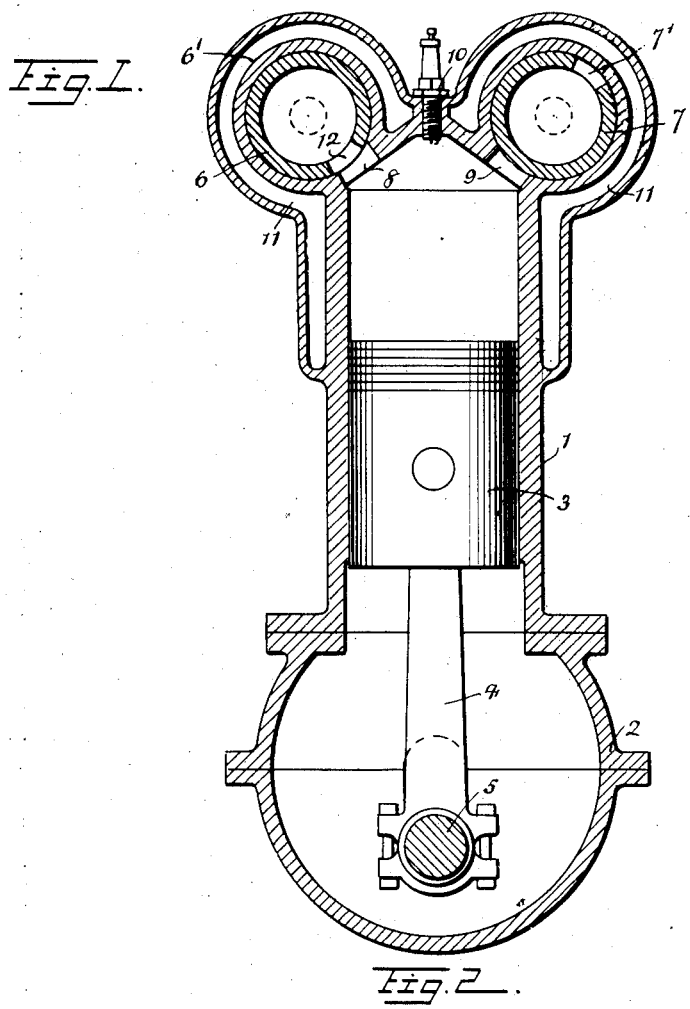
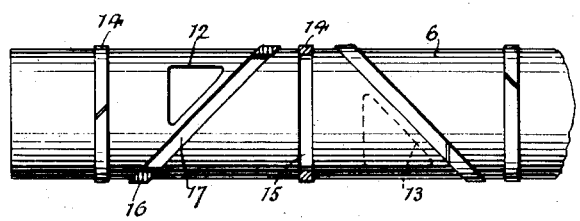
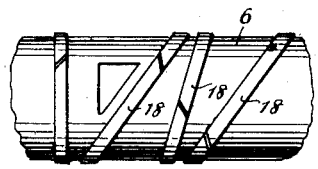
WITNESSES
H. T. Walker
S. W. Foster
INVENTOR
C. H. Seifert
BY
ATTORNEYS Patented July 12, 1927.

1,635,963

UNITED STATES PATENT OFFICE.

CHARLES HENRY SEIFERT, OF HEMPSTEAD, NEW YORK.

ROTARY VALVE.

Application filed May 18, 1926. Serial No. 109,946.

This invention relates to rotary valves and, more particularly, to rotary valves for internal combustion engines, an object of the invention being to provide the rotary valves with packing rings located at an angle to the longitudinal axis of the valves, extending around the valves and across the transverse planes of the valves and engine ports so, as to prevent possibility of leakage and consequent loss of pressure and efficiency.

A further object is to provide a valve of this character having an improved arrangement of ports and packing rings capable of a wide range of modification but insuring a more efficient performance than is possible with rotary valves such as heretofore known.

With these and other objects in view, the invention consists in certain novel features of construction and combinations and arrangements of parts, which will be more fully hereinafter described and pointed out in the claims.

In the accompanying drawings—

Figure 1 is a view in longitudinal section through an internal combustion engine provided with my improved rotary valve;

Figure 2 is a view in elevation, partly in section, showing one of the valves removed;

Figure 3 is a view similar to Figure 2, illustrating a modification.

I have illustrated my invention particularly in connection with a special type of engine which I shall proceed to describe, but I would have it distinctly understood that my invention relates to the construction of a valve which may be used in combination with various types of engine and I do not wish to be limited to any particular engine structure.

1 represents the cylinder of the engine, 2 the crank case, 3 the piston, 4 the connecting rod, and 5 the crank shaft located in the crank case 2. The engine may be either two or four-cycle and my improved rotary inlet and exhaust valves 6 and 7 are housed in cylindrical valve casings or chambers 6' and 7' and may be operated from any desired source of power and may be variously located on variously shaped cylinders.

I have shown these rotary valves as located at the upper end or head of the engine, communicating with inlet ports 8 and 9, respectively, in the head, and I have shown a spark plug 10 in the upper extremity of the head but of course do not limit myself to this particular arrangement of parts.

The essential features of my invention reside in the construction and arrangement of the valve itself. While I have shown the valves of the same size and their water jackets 11 of the same size I do not limit myself in this particular.

Particular attention is called to Figure 2 in the drawing, in which one of the valves 6 is illustrated, the other valve being precisely the same in construction but may vary in size as desired.

It is also to be understood that while I have shown the valve in connection with a single cylinder it is apparent that it may be used in connection with a line of cylinders having their ports properly positioned.

Assuming the valve shown in Figure 2 to be the inlet valve 6, 12 represents the inlet port which is adapted to register with the port 8 of the engine cylinder. Another port 13 is shown in dotted lines which is adapted for communication with a second cylinder (not shown).

Between the ports 12 and 13 of the valve 6 packing rings 14 are located in grooves 15, and between these rings 14 and extending diagonally to the longitudinal axis of the valve a packing ring 16 is located in a groove 17. All of these packing rings 15 and 16 may be of any standard or special type, but are preferably of split metallic form, resilient and capable of expansion and contraction.

The ring 16 extends completely around the valve 6 and across the transverse plane of port 12 so that when this port 12 is out of register with the port 8 the packing ring 16 will act as a complete cut-off, preventing any leakage around the valve through the port so that there can be no loss of pressure in the engine cylinder either on the compression or firing stroke of the piston.

These valves 6 and 7 are not only cylindrical in form but they are also tubular and constitute passages through which the gases pass longitudinally of the valves both in supplying fuel to the engine and exhausting the exploded gases therefrom.

In Figure 3 I illustrate a plurality of diagonally disposed rings 18 around the valves, and said diagonally arranged rings may be variously located and provided in any desired numbers and arrangements, providing of course that the essential feature is included of so positioning at least one of these rings that it will act as a cut-off between the port of the engine and the valve and will prevent leakage and by-passing of the gases. Such valves may be lubricated in various forms, in various ways, and the arrangement of the rings will facilitate such lubrication without permitting the flooding of the ports.

I therefore do not wish to be limited to the specific construction illustrated and described, but desire to cover my invention broadly, embodying such modifications and arrangements as fairly fall within the spirit and scope of the appended claims.

I claim:

1. A cylindrical rotary valve for engines, constituting a passage for gases and having a port therein adapted to register with the port in the engine, and a diagonally arranged packing ring around the valve cylinder and extending across the transverse plane of the port.

2. A cylindrical rotary valve for engines, constituting a passage for gases and having a port therein to register with the port in the engine, a diagonally arranged packing ring around the valve cylinder and extending across the transverse plane of the port, and other rings around the valve at opposite sides of said diagonal ring.

3. In combination with an internal combustion engine having a pair of cylindrical valve casings and ports communicating therewith, of hollow cylindrical rotary valves in said valve chambers having ports therein, diagonally arranged packing rings around the valves functioning as cut-offs between the ports of the engine and the ports of the valves, and other packing rings around the valves.

4. In combination with an internal combustion engine having a pair of cylindrical valve casings and ports communicating therewith, of hollow cylindrical rotary valves in said valve chambers having ports therein, diagonally arranged packing rings around the valves functioning as cut-offs between the ports of the engine and the ports of the valves, and other packing rings around the valves, said packing rings constituting split resilient rings and said valves having grooves receiving the rings.

CHARLES HENRY SEIFERT.